United States Patent [19]

Upchurch

[11] Patent Number: 4,874,555
[45] Date of Patent: Oct. 17, 1989

[54] SOYBEAN PROCESS
[75] Inventor: Ray Upchurch, Texarkana, Ark.
[73] Assignee: The French Oil Mill Machinery Co., Piqua, Ohio
[21] Appl. No.: 189,260
[22] Filed: May 2, 1988
[51] Int. Cl.$^4$ .............................................. C11B 1/10
[52] U.S. Cl. ............................ 260/412.4; 260/412.2; 426/417; 426/634
[58] Field of Search .................... 260/412.2, 412.4; 426/417, 634

[56] References Cited

U.S. PATENT DOCUMENTS

| | | | |
|---|---|---|---|
| 1,684,654 | 9/1928 | Albers | 426/96 |
| 2,585,793 | 2/1952 | Kruse | 426/622 |
| 2,614,045 | 10/1952 | Learmonth | 426/629 |
| 2,904,435 | 9/1959 | Kruse | 426/96 |
| 2,952,540 | 9/1960 | Kruse | 426/96 |
| 3,033,683 | 5/1962 | Witte et al. | 426/622 |
| 4,233,322 | 11/1980 | Fritze | 426/46 |
| 4,681,029 | 7/1987 | Bartesch et al. | 99/483 |

OTHER PUBLICATIONS

"Conditioning of Oil–Bearing Materials for Solvent Extraction by Extrusion", Herman Rittner, Jour. of Amer. Oil Chem. Soc., vol. 61, No. 7, (Jul. 1984), pp. 1200–1203.

*Primary Examiner*—Werren B. Lone
*Assistant Examiner*—Vera C. Clarke
*Attorney, Agent, or Firm*—Biebel, French & Nauman

[57] ABSTRACT

Process for converting raw soybean materials into soybean oil and soybean meal without flaking the soybeans during the process is disclosed. The soybeans are cracked into a plurality of kernel portions and hull portions. The cracked kernel portions are then pulverized in a hammermill or the like and are then conveyed to a screw-type conveyor wherein steam is injected through the screw conveyor housing. Breaker pins extend radially inwardly from the screw housing and are located between rotating screw flights so as to provide a working, sheering action on the steam-treated particles as they are conveyed by the screw conveyor. A die plate with apertures therein is disposed at the downstream portion of the screw conveyor and in fluid-tight relationship therewith to form back pressure. The steam-treated particles exit the die plate through the apertures in the form of pellets.

15 Claims, 2 Drawing Sheets

SOYBEAN PROCESS

FIELD OF THE INVENTION

The present invention pertains to an improved process for treating soybeans so as to extract soybean oil therefrom and to produce soybean meal.

BACKGROUND OF THE INVENTION

Traditional approaches to the art of soybean processing involve the use of cumbersome, expensive machinery to facilitate preparation of the soybean prior to solvent extraction. For instance, after cracking of the beans and subsequent separation of the hull from the kernel portions, the cracked kernels are steam conditioned in large pressure cookers called "bean conditioners" which are located upstream from a flaking mill.

The flaking mill machine itself is a large, expensive machine that requires considerable energy to run. It requires operator skill to maintain proper flake thickness and is the source of considerable maintenance in periodically removing and grinding the rolls. The flaking mill functions to squeeze and impart a slight shear to the steam conditioned kernels resulting in the formation of a thin metal flake having a diameter of around 0.50 inch and a thickness of about 10-16 mils.

After the meal has been flaked, the traditional approach is to route the flaked meal to a further heat processing step or directly to extraction processes. This further heat processing step may occur within a jacketed screw press conveyor with steam being injected into the working section of the conveyor. The flakes are there steam treated and are mechanically worked via action of the screw flights and breaker pins which extend radially inwardly into the space between screw flights. The flakes are also subjected to back pressure caused by the die plate at the downstream end of the screw conveyor. The meal exiting the die orifices of the screw conveyor can best be described as including dust-like particles which are combined in the form of a pellet or pellets.

After the flaked, steam treated pellets exit the second heating step, they are sent to extraction processes including extractors, desolventizer-toasters, dryer-cooler, meal grinding and meal storage stations. Basically, during these processes the meal is mixed with a solvent, such as hexane, which dissolves the soybean oil. The soybean oil-solvent mixture is then separated from the meal particles. The desired soybean oil may then be isolated from the solvent solution by conventional techniques such as distillation, etc. The meal itself is desolventized, dried and then ground and stored prior to use and/or sale.

The present inventor was faced with the problem of attempting to minimize machine asset expenditures, space requirements, and energy consumption in a soybean process. To this end, it was surprisingly discovered that good quality meal and satisfactory oil recovery could be obtained even when the flaking process was entirely eliminated. Additionally, and as a departure from certain prior art processes involving the use of a second heat treatment step after flaking, only a single heat treatment step upstream from the extraction process station was necessary.

SUMMARY OF THE INVENTION

In accordance with the invention, a process is provided for converting raw soybeans into soybean oil and soybean meal without flaking the soybeans during the process. The process comprises cracking the soybeans to form a plurality of kernel portions and hull portions. The hull portions are removed from the kernels by a vacuum screen or similar device. Next, the kernel portions are pulverized in a hammermill or the like to form powder-like particles having diameters on the order from about 10 to about 20 mils. Subsequently, the powder-like particles enter a jacketed screw press conveyor wherein steam is injected into the jacket enclosure. As the particles are steam treated and advance along the rotating screw flights, they are mechanically worked via the action of breaker pins which are attached to the housing and extend radially inwardly between the screw flights. At the downstream end of the screw conveyor, a die plate with orifice openings therein is disposed and the so stream treated and worked soybean particles are caused to exit through the die orifices. The particles upon exiting the screw conveyor at the orifice openings are in the form of pellets having a bulk density of about 35-40lb./ft$^3$. The pellets are then passed to conventional extractor, desolventizer-toaster, grinding and storage stations.

PRIOR ART

U.S. Pat. No. 1,684,654 (Albers) discloses a method in which soybean meal is first obtained. The meal cake is broken up, ground, and dried until the moisture content thereof is about 10%. A second round of grinding and drying forms meal containing about 8% oil. The resulting meal is then ground into a fine flour.

U.S. Pat. No. 2,904,435 (Kruse) and 2,952,540 (Kruse) disclose methods for forming fibrous flaked products from the hull portions of soybeans, oats, etc. The separated hulls are mixed with water and optionally with oil or fat. The hulls are then steam treated, flaked, broken, and optionally mixed with molasses or the like. They may be used as livestock feed.

In accordance with U.S. Pat. No. 4,681,029 Bartesch et al, soybeans are heated in a first of two successively related arranged fluidized beds. The soybeans are then fed to the second fluidized bed where they are maintained in a heated condition and from which location they are infed in a heated state to a breaking or cracking mill. The cracked soybeans are then flaked. A mechanical dehuller is located between the first and second fluidized beds.

Of possible interest is U.S. Pat. No. 4,233,322 (Fritze) wherein leguminous vegetables are finely milled while dry. Next, the milled legume is mixed with alpha amylase and water, subjected to a short intensive boiling, allowed to sit for 10-45 minutes and then dried.

The above prior art patents fail to teach or suggest a process as herein required which eliminates the need for flaking in soybean processes and provides for a dry, pulverized soybean prior to heat treatment thereof so that the beans will have a higher affinity for steam retention in the heat treating step.

The invention is further illustrated by the appended drawings in which:

DETAILED DESCRIPTION OF THE PREFERRED EMBODIMENT

Figure 1:
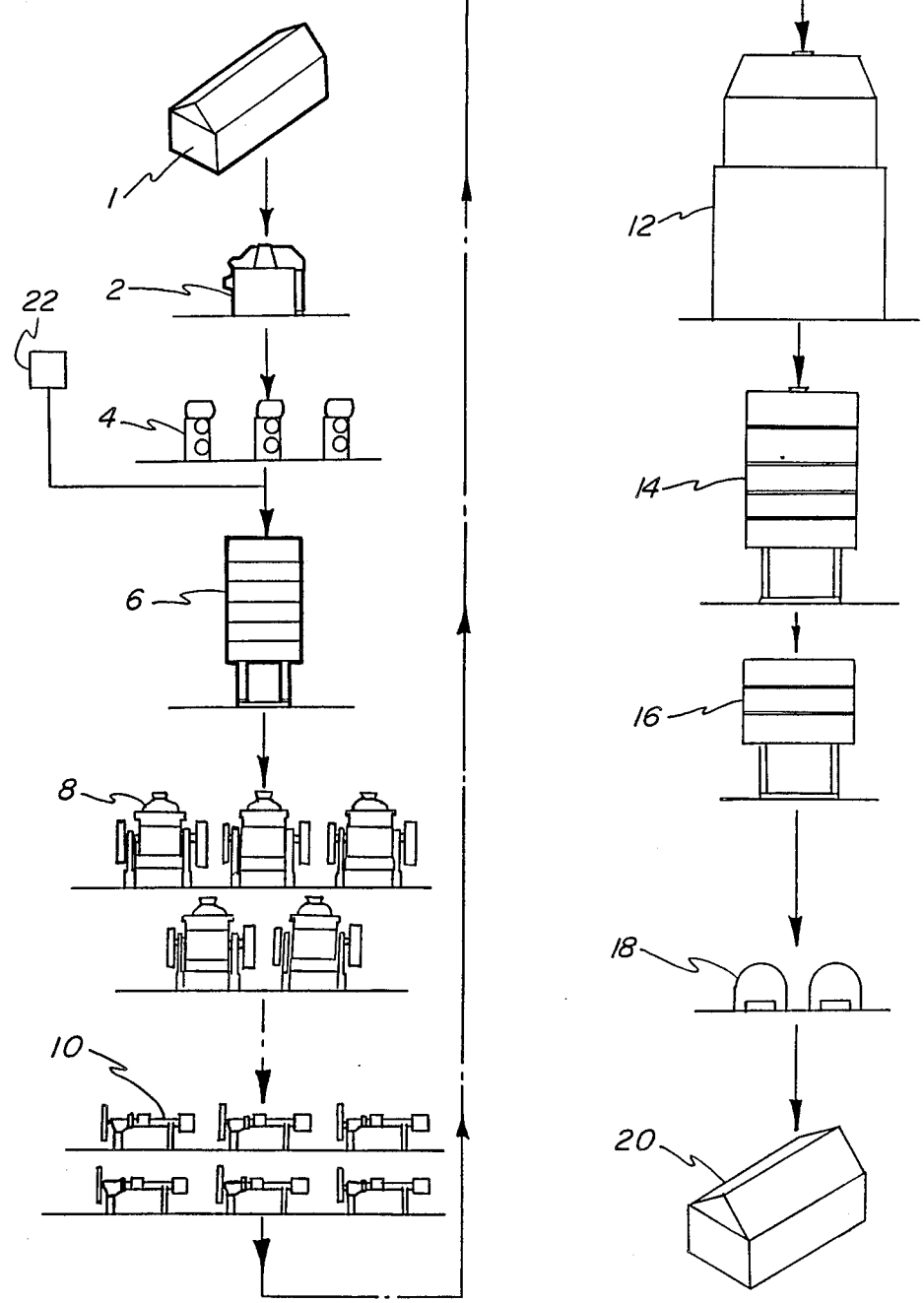
FIG. 1 is a schematic process diagram of a traditional prior art method of processing soybeans.

Turning now to the drawings and specifically to FIG. 1 thereof, there is shown a conventional prior art process for processing soybeans so as to extract oil therefrom and to produce soybean meal. The beans are conveyed to a bean cleaner 2, wherein a shaker screen or the like is provided with impurities being suctioned off from the beans by means of a vacuum or the like. The beans then travel to cracking roll station 4 wherein the beans are cracked between the nip of opposed, rotating cylinders. The hulls may be eliminated from the process by means of a de-hulling station 22 which is well known in the art.

At the cracking station 4, the kernel portions of the soybeans are commonly cracked into as many as six parts. Downstream from cracking roll 4 in the conventional process is a conditioner station 6 which basically consists of a large pressure cooker wherein 150 psi steam commonly is utilized to steam-condition the kernels. Commonly, the kernels remain in the conditioning station 6 for about a half hour residence time. The resulting kernels are soft and have a high moisture content of about 10%-12%.

After such steam conditioning, the beans are conveyed to a flaking roll station 8 wherein in accordance with conventional technology, the beans are passed through the nip of rotating rolls which are mechanically or hydraulically forced together. The rolls rotate at a slight speed differential so that a slight drawing or stretching is accomplished. This ruptures oil cells in the kernels and provides a soybean flake having a thickness of about 10-16 mils and a diameter of about 0.50 inch. The density of the flakes is on the order of about 20-26lbs./ft$^3$.

After flaking, the beans may be conveyed to an optional screw press station 10 which consists of a rotating screw conveyor provided within a jacket-like enclosure. Steam is admitted through the housing of the screw conveyor. The flaked kernels advance along the screw flights and are mechanically worked via the action of the screw flights and by the utilization of breaker pins which are disposed between the screw flights and extend radially inwardly from the housing. At the downstream portion of the screw conveyor, the kernels are passed through die orifices and exit in the form of pellets having sizes on the order of about ½" diameter with about ¾" lengths. The pellets are formed from a fine powdery flake material produced as a result of the flaking roll station 8 and screw press 10 combination.

The thus treated soybean kernels are then forwarded to an extractor station 12 wherein a solvent for the soybean oil, commonly hexane, is caused to contact and flow through the treated kernels in accordance with conventional techniques. The retained solvent is separated from the extracted material in a desolventizer-toaster 14. Steam sparging is usually employed here so as to facilitate separation. The desired soybean oil is isolated from the oil-hexane miscella via conventional distillation techniques. The thus treated kernel portions or meal is then forwarded to a dryer-cooler station 16, is ground at station 18 and may be stored for use and/or sale at station 20.

Figure 2:
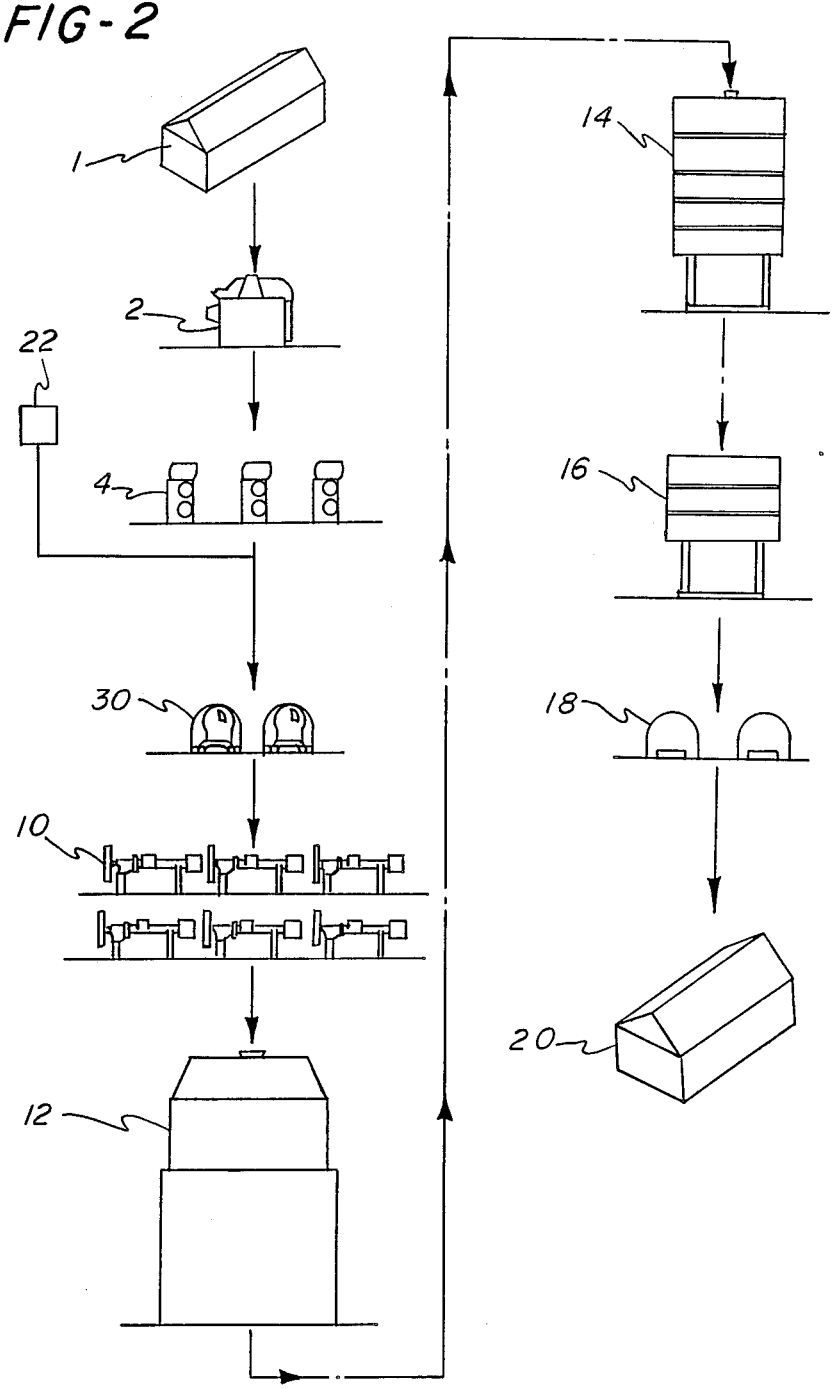
FIG. 2 is a schematic process diagram of a method of processing soybeans in accordance with the invention.

Turning now to FIG. 2, a process in accordance with the invention is therein depicted. As can be readily seen, the process eliminates utilization of the bean conditioner 6 which is conventionally employed. This is highly advantageous in that the conditioner is a large cumbersome machine which is expensive to buy and to maintain. After the beans have been cracked at the cracking roll station 4 and dehulled by conventional means 22, the kernel portions are forwarded to a pulverizing station 30. The pulverizer may comprise a hammer mill or like apparatus which is adapted to pulverize the kernel portions so as to result in a multiplicity of powder-like particles commonly having sizes within the range of about 10 mils to about 20 mils. It is noted that at the pulverizer 30, the treated beans are still in the dry condition (i.e., 9.5 to about 11% moisture content). Suitable hammer mills include those sold by Koppers, Inc. under the "Sprout-Waldron CG" trademark. In these hammer mills, the cracked kernels are driven against a breaker plate where primary size reduction is accomplished. The hammers then drive the material against a screen wherein further pulverizing occurs. Final particle size is governed by the diameter of the orifices in the screen.

Other suitable hammer mills are built and sold by Prater, Inc. of Chicago, Ill., and are classified as "double screen" or "triple screen". In either instance, pulverizing ruptures oil cells and provides a fine particle size for subsequent delivery to the screw press station.

Immediately downstream from pulverizer 30, a screw press station 10 is located which is a screw conveyor enclosed within a housing. Breaker pins extend radially inwardly from the housing between rotating screw flights to aid in mechanically working the advancing kernel particles. Pressurized steam is injected through the screw conveyor housing. The screw press continues to rupture oil cells and provides an easily extractable soybean pellet having a bulk density of about 35-40 pounds per cubic foot. A preferred screw press is available from French Oil Mill Co., Piqua, Ohio, under the "Enhanser Press" trademark.

After exiting the screw press 10, the beans are, in similar fashion to the conventional technology shown in FIG. 1, passed to an extractor station 12 wherein hexane or a suitable solvent is intimately admixed with the meal material. Subsequently, the beans are passed to a desolventizer-toaster 14 wherein the retained solvent is separated from the extracted material portion of the beans. The meal is then dried and cooled at station 16, ground at station 18 and may be stored at station 20 for sale and/or subsequent processing.

It is apparent then that the present invention, eliminates the use of the expensive conditioning step and substitutes only one heat treatment step, namely use of screw press 10, prior to the extraction phase (12, 14, 16) of the process.

Advantages of the process shown in FIG. 2 include reduced capital equipment costs in that the pulverizer and screw presses are much less expensive than the bean conditioning and flaking roll stations conventionally used. Also, an increased density pellet is formed when compared to use of the prior art flaked beans. This allows for utilization of a smaller extractor during the extraction phase of the soybean processing.

Additionally, the method in accordance with FIG. 2 will reduce electrical consumption in that the pulverizer will take less power to operate than the bean conditioner of the prior art process. Still further, steam consumption will be reduced by the process herein disclosed and claimed in that the screw press will use much less steam than the conventional bean conditioner does.

Also of importance is the fact that the flaking roll is totally eliminated. As is well known in the art, the flaking rolls are high maintenance headaches because of the roll grinding procedure. Another advantage is that use of the present process will no longer necessitate utilization of an experienced preparation operator to maintain proper bean conditioning and flake thickness. The pulverizer and screw press are much easier to operate.

While these are shown and described presently preferred embodiments of the invention, it is to be understood that the invention is not limited thereto, but may be otherwise variously embodied and practiced within the scope of the following claims.

I claim:

1. In a method for processing soybeans in which hull portions are separated from the kernel portions of the soybean, the improvement comprising cracking said kernels into a plurality of kernel portions, pulverizing said cracked kernel portions to form powder-like particles, steam-treating said pulverized kernels under pressure conditions, and forming porous pellets by passing said steam-treated particles through a die orifice.

2. A method as recited in claim 1 further comprising subsequently extracting oil from said steam-treated particles.

3. A process as recited in claim 2 wherein said extraction comprises contacting said steam-treated particles with a solvent in which said oil is miscible, and separating said solvent and oil mixture from said particles.

4. A process as recited in claim 3 wherein said oil is isolated from said solvent.

5. A process as recited in claim 3 wherein said solvent comprises hexane.

6. A process as recited in claim 1 wherein said powder-like particles have sizes within the range of about 10 mils to about 20 mils.

7. A process as recited in claim 1 wherein said pellets have sizes within the range of about 0.5 to 1.0 inch in diameter and from about ½-1" in length.

8. A process as recited in claim 4 further comprising toasting said particles to aid in further separation of said solvent-oil mixture therefrom.

9. A process as recited in claim 8 further comprising drying said toasted particles.

10. A process as recited in claim 9 further comprising grinding said dried, toasted particles.

11. A method for converting raw soybeans into soybean oil and soybean meal fractions comprising:
    (a) cracking said soybeans to form a plurality of kernel portions and hull portions,
    (b) removinng the hull portions from said kernel portions,
    (c) pulverizing said kernel portions to form small powder-like particles having sizes of from about 10 mils to about 20 mils,
    (d) subsequently steam-treating said powder-like particles and passing said powder-like particles through a die orifice in order to from porous pellets, and
    (e) extracting soybean oil from said porous pellets.

12. A process as recited in claim 11 wherein said step (d) comprises passing said powder-like particles through an enclosed screw-type conveyor and injecting steam into said enclosed conveyor.

13. In a process of extracting oil from raw soybeans of the type having a hull portion surrounding the soybean kernel, comprising the steps of:
    (a) cleaning picked raw soybeans,
    (b) cracking said cleaned soybeans,
    (c) separating said hulls from said kernels,
    (d) cooking said kernels under high temperature and increased pressure conditions, and
    (e) extruding kernels resulting from said step (d) through a die to form pellets, the improvement comprising:
    (f) pulverizing said kernels after step (c) and prior to step (d) to promote heat absorption by said kernels during said step (d).

14. A process as recited in claim 13 wherein said step (f) comprises pulverizing said kernels to form powder-like particles, a majority of which have particle sizes of from about 10 to about 20 mils.

15. A process for converting raw soybean materials into soybean oil and soybean meal without flaking said soybeans, said process comprising:
    (a) cracking said soybeans to form a plurality of kernel portions and hull portions,
    (b) removing the hull portions from said kernel portions,
    (c) pulverizing the kernel portions to form small powder-like particles having diameters of from about 10 to about 20 mils,
    (d) subsequently steam-treating said powder-like particles and passing said powder-like particles through a die orifice in order to form porous pellets, and
    (e) extracting soybean oil from said porous pellets.

* * * * *

UNITED STATES PATENT AND TRADEMARK OFFICE
CERTIFICATE OF CORRECTION

PATENT NO. : 4,874,555
DATED : October 17, 1989
INVENTOR(S) : Ray Upchurch

It is certified that error appears in the above-identified patent and that said Letters Patent is hereby corrected as shown below:

Column 1, line 25, "thin metal flake" should be --thin meal flake--.

Signed and Sealed this

Eighteenth Day of September, 1990

Attest:

HARRY F. MANBECK, JR.

*Attesting Officer*  *Commissioner of Patents and Trademarks*